United States Patent
Chun et al.

(10) Patent No.: US 8,509,167 B2
(45) Date of Patent: Aug. 13, 2013

(54) METHOD OF EFFECTIVELY TRANSMITTING IDENTIFICATION INFORMATION OF TERMINAL DURING THE GENERATION OF DATA BLOCK

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 461 days.

(21) Appl. No.: 12/738,625

(22) PCT Filed: Oct. 20, 2008

(86) PCT No.: PCT/KR2008/006200
§ 371 (c)(1),
(2), (4) Date: Apr. 21, 2010

(87) PCT Pub. No.: WO2009/054656
PCT Pub. Date: Apr. 30, 2009

(65) Prior Publication Data
US 2010/0215013 A1 Aug. 26, 2010

Related U.S. Application Data

(60) Provisional application No. 60/982,120, filed on Oct. 23, 2007, provisional application No. 60/983,304, filed on Oct. 29, 2007, provisional application No. 60/984,052, filed on Oct. 31, 2007, provisional application No. 61/018,884, filed on Jan. 3, 2008, provisional application No. 61/019,575, filed on Jan. 7, 2008.

(30) Foreign Application Priority Data

Oct. 17, 2008 (KR) .......................... 10-2008-0102222

(51) Int. Cl.
*H04W 4/00* (2009.01)
*H04B 7/212* (2006.01)
*H04J 3/17* (2006.01)
*H04L 12/403* (2006.01)

(52) U.S. Cl.
USPC ........ 370/329; 370/348; 370/349; 455/435.1; 455/452.1; 455/464

(58) Field of Classification Search
USPC ................ 370/312, 322, 328–333, 347, 341, 370/348–350; 455/435.1, 435.2, 452.1, 509
See application file for complete search history.

(56) References Cited

U.S. PATENT DOCUMENTS

| | | | |
|---|---|---|---|
| 6,445,917 B1 | 9/2002 | Bark et al. | |
| 6,594,240 B1 | 7/2003 | Chuah et al. | |

(Continued)

FOREIGN PATENT DOCUMENTS

| | | |
|---|---|---|
| CN | 1314747 | 9/2001 |
| CN | 1339903 | 3/2002 |

(Continued)

OTHER PUBLICATIONS

LG Electronics, "Update of EUTRAN PDCP Specification", R2-081390, 3GPP TSG-RAN2 Meeting #61, Jan. 2008.

(Continued)

*Primary Examiner* — Awet Haile
(74) *Attorney, Agent, or Firm* — Lee, Hong, Degerman, Kang & Waimey (57) ABSTRACT

A radio communication system for a radio communication service and a terminal is provided, namely, a method for communicating data blocks between a base station and the terminal in Evolved Universal Mobile Telecommunications System (E_UMTS) or Long Term Evolution (LTE) System evolved from UMTS, and more particularly, to a method of effectively identifying a transmitter of a data block received by a receiver.

7 Claims, 3 Drawing Sheets

(56) References Cited

U.S. PATENT DOCUMENTS

| | | |
|---|---|---|
| 6,594,244 B1 | 7/2003 | Chang et al. |
| 6,628,946 B1 | 9/2003 | Wiberg et al. |
| 6,728,918 B1 | 4/2004 | Ikeda et al. |
| 6,862,450 B2 | 3/2005 | Mikola et al. |
| 7,171,163 B2 | 1/2007 | Terry et al. |
| 7,227,868 B2 | 6/2007 | Inden |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 8,270,348 B2 | 9/2012 | Chun et al. |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0099305 A1 | 5/2003 | Yi et al. |
| 2004/0008659 A1 | 1/2004 | Kim |
| 2004/0076182 A1 | 4/2004 | Wu |
| 2004/0103435 A1 | 5/2004 | Yi et al. |
| 2004/0117860 A1* | 6/2004 | Yi et al. ............ 725/147 |
| 2004/0146019 A1 | 7/2004 | Kim et al. |
| 2004/0148396 A1 | 7/2004 | Meyer et al. |
| 2004/0153852 A1 | 8/2004 | Wu |
| 2004/0156330 A1* | 8/2004 | Yi et al. ............ 370/328 |
| 2004/0184438 A1 | 9/2004 | Terry |
| 2004/0208160 A1* | 10/2004 | Petrovic et al. ............ 370/350 |
| 2004/0223507 A1 | 11/2004 | Kuchibhotla et al. |
| 2004/0229626 A1 | 11/2004 | Yi et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0237960 A1* | 10/2005 | Kim ............ 370/312 |
| 2005/0238051 A1 | 10/2005 | Yi et al. |
| 2005/0249141 A1 | 11/2005 | Lee et al. |
| 2005/0254467 A1 | 11/2005 | Li et al. |
| 2005/0286483 A1 | 12/2005 | Lee et al. |
| 2006/0007886 A1 | 1/2006 | Lee et al. |
| 2006/0030342 A1 | 2/2006 | Hwang et al. |
| 2006/0056441 A1 | 3/2006 | Jiang |
| 2006/0067238 A1 | 3/2006 | Olsson et al. |
| 2006/0067364 A1 | 3/2006 | Jung et al. |
| 2006/0072503 A1 | 4/2006 | Kim et al. |
| 2006/0092972 A1 | 5/2006 | Petrovic et al. |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251105 A1 | 11/2006 | Kim et al. |
| 2006/0264179 A1 | 11/2006 | Bonneville et al. |
| 2006/0274690 A1 | 12/2006 | Chun et al. |
| 2006/0281456 A1 | 12/2006 | Roberts et al. |
| 2007/0041397 A1 | 2/2007 | Hwang |
| 2007/0047452 A1 | 3/2007 | Lohr et al. |
| 2007/0047493 A1 | 3/2007 | Park et al. |
| 2007/0053309 A1 | 3/2007 | Poojary et al. |
| 2007/0079207 A1 | 4/2007 | Seidel et al. |
| 2007/0081513 A1 | 4/2007 | Torsner |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0178878 A1 | 8/2007 | Ding |
| 2007/0183358 A1 | 8/2007 | Cai |
| 2007/0189205 A1 | 8/2007 | Terry et al. |
| 2007/0201397 A1 | 8/2007 | Zhang |
| 2007/0206530 A1 | 9/2007 | Lee et al. |
| 2007/0223526 A1 | 9/2007 | Jiang |
| 2007/0258591 A1 | 11/2007 | Terry et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0045224 A1 | 2/2008 | Lu et al. |
| 2008/0049682 A1 | 2/2008 | Ding et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0212605 A1 | 9/2008 | Jiang |
| 2008/0232396 A1 | 9/2008 | Buckley et al. |
| 2008/0233940 A1 | 9/2008 | Jen |
| 2008/0233941 A1 | 9/2008 | Jen |
| 2008/0261581 A1 | 10/2008 | Cai |
| 2008/0268878 A1 | 10/2008 | Wang et al. |
| 2008/0273482 A1 | 11/2008 | Lee et al. |
| 2008/0273610 A1 | 11/2008 | Malladi et al. |
| 2008/0318566 A1 | 12/2008 | Chun et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0041240 A1* | 2/2009 | Parkvall et al. ............ 380/247 |
| 2009/0046631 A1 | 2/2009 | Meylan et al. |
| 2009/0046667 A1 | 2/2009 | Pelletier et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0119564 A1 | 5/2009 | Sagfors et al. |
| 2009/0156194 A1 | 6/2009 | Meylan |
| 2009/0175163 A1 | 7/2009 | Sammour et al. |
| 2009/0175253 A1 | 7/2009 | Wu et al. |
| 2009/0190480 A1 | 7/2009 | Sammour et al. |
| 2009/0232076 A1 | 9/2009 | Kuo |
| 2009/0259908 A1 | 10/2009 | Gollapudi |
| 2009/0305712 A1 | 12/2009 | Franceschini et al. |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |
| 2010/0157904 A1 | 6/2010 | Ho et al. |

| | | | |
|---|---|---|---|
| 2010/0232335 A1 | 9/2010 | Lee et al. | |
| 2010/0260140 A1* | 10/2010 | Zhu ............................ | 370/331 |
| 2011/0019604 A1 | 1/2011 | Chun et al. | |
| 2011/0033048 A1 | 2/2011 | Stanwood et al. | |
| 2011/0149865 A1 | 6/2011 | Lee et al. | |

FOREIGN PATENT DOCUMENTS

| | | |
|---|---|---|
| CN | 1396780 | 2/2003 |
| CN | 1549610 | 11/2004 |
| CN | 1613210 | 5/2005 |
| CN | 1642067 | 7/2005 |
| CN | 1761260 | 4/2006 |
| CN | 1761356 | 4/2006 |
| CN | 1792048 | 6/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 101047966 | 10/2007 |
| CN | 101090281 | 12/2007 |
| CN | 101690375 | 9/2012 |
| EP | 1263160 | 12/2002 |
| EP | 1326397 | 7/2003 |
| EP | 1509011 | 2/2005 |
| EP | 1638237 | 3/2006 |
| EP | 1768297 | 3/2007 |
| EP | 2026523 | 2/2009 |
| EP | 2163006 | 3/2012 |
| JP | 1995162948 | 6/1995 |
| JP | 2000-324161 | 11/2000 |
| JP | 2001-197021 | 7/2001 |
| JP | 2001197021 | 7/2001 |
| JP | 2002198895 | 7/2002 |
| JP | 2003-018050 | 1/2003 |
| JP | 2003-115796 | 4/2003 |
| JP | 2003115876 | 4/2003 |
| JP | 2003516021 | 5/2003 |
| JP | 2003229925 | 8/2003 |
| JP | 2003-283592 | 10/2003 |
| JP | 2005-073276 | 3/2005 |
| JP | 2006-054718 | 2/2006 |
| JP | 2006-505209 | 2/2006 |
| JP | 2006505209 | 2/2006 |
| JP | 2006-514466 | 4/2006 |
| JP | 2006-121562 | 5/2006 |
| JP | 2006311543 | 11/2006 |
| JP | 2007116639 | 5/2007 |
| JP | 2007312244 | 11/2007 |
| JP | 2008-520125 | 6/2008 |
| JP | 2009-513058 | 3/2009 |
| JP | 2009521893 | 6/2009 |
| KR | 10-2001-0045783 | 6/2001 |
| KR | 2003-0060055 | 7/2003 |
| KR | 1020030087914 | 11/2003 |
| KR | 10-2004-0034398 | 4/2004 |
| KR | 10-2005-0103127 | 10/2005 |
| KR | 1020050103127 | 10/2005 |
| KR | 1020060004935 | 1/2006 |
| KR | 10-2006-0029452 | 4/2006 |
| KR | 2006-0079784 A | 7/2006 |
| KR | 10-2006-0090191 | 8/2006 |
| KR | 10-2007-0076374 | 7/2007 |
| KR | 10-0907978 | 7/2009 |
| KR | 10-2009-0084756 | 8/2009 |
| RU | 2304348 | 8/2007 |
| TW | 496058 | 7/2002 |
| WO | 0137473 | 5/2001 |
| WO | 2004042953 | 5/2004 |
| WO | 2004/102838 | 11/2004 |
| WO | 2005/078967 | 8/2005 |
| WO | 2005/079105 | 8/2005 |
| WO | 2005/109671 | 11/2005 |
| WO | 2005122441 | 12/2005 |
| WO | 2006009714 | 1/2006 |
| WO | 2006/016785 | 2/2006 |
| WO | 2006/033521 | 3/2006 |
| WO | 2006/052086 | 5/2006 |
| WO | 2006083149 | 8/2006 |
| WO | 2006/095385 | 9/2006 |
| WO | 2006/104335 | 10/2006 |
| WO | 2006/104342 | 10/2006 |
| WO | 2006/116620 | 11/2006 |
| WO | 2006/118435 | 11/2006 |
| WO | 2006118418 | 11/2006 |
| WO | 2007/020070 | 2/2007 |
| WO | 2007/023364 | 3/2007 |
| WO | 2007/039023 A1 | 4/2007 |
| WO | 2007/045505 | 4/2007 |
| WO | 2007/052921 | 5/2007 |
| WO | 2007/078155 | 7/2007 |
| WO | 2007/078156 | 7/2007 |
| WO | 2007/078174 | 7/2007 |
| WO | 2007/079085 | 7/2007 |
| WO | 2007/091831 | 8/2007 |
| WO | 2007147431 | 12/2007 |
| WO | 2008/010063 | 1/2008 |
| WO | 2008004725 | 1/2008 |
| WO | 2008/094120 | 8/2008 |
| WO | 2009/035301 | 3/2009 |

OTHER PUBLICATIONS

Zte, "Redundant Retransmission Restraint in RLC-AM," R2-061234, 3GPP TSG RAN WG2 Meeting #53, May 2006, XP-050131180.

European Telecommunications Standards Institute (ETSI), "Digital Cellular Telecommunications System (Phase 2+); Functional Stage 2 Description of Location Services (LCS) in GERAN (Release 7)," ETSI TS 143 059, v7.3.0, May 2007, XP-014038519.

LG Electronics Inc., "UE State Transition in LTE_ACTIVE," R2-061002, 3GPP TSG-RAN WG2 #52, Mar. 2006, XP-050130928.

Texas Instruments, "UL Synchronization Management and Maintenance in E-UTRA," R1-072198, 3GPP TSG RAN WG1 #49, May 2007, XP-050105936.

Texas Instruments, "UL Synchronization Management in LTE_ACTIVE," R1-071478, 3GPP TSG RAN WG1 #48bis, Mar. 2007, XP-050105413.

Motorola, "Contention-free Intra-LTE Handover," R2-070730, 3GPP TSG-RAN WG2 #57, Feb. 2007, XP-050133763.

Ericsson, "Scheduling Request in E-UTRAN," R1-070471, 3GPP TSG-RAN WG2 #47bis, Jan. 2007, XP-050104502.

Amitava Ghosh et al., "Random Access Design for UMTS Air-Interface Evolution", pp. 1041-1045, Apr. 2007.

NTT DoCoMo et al., "Scheduling Request Transmission Method for E-UTRA Uplink," R1-063301, 3GPP TSG RAN WG1 Meeting #47, Nov. 2006.

Motorola, "Synchronized Random Access Channel and Scheduling Request," R1-063046, 3GPP TSG RAN1 #47, Nov. 2006.

Ericsson, "Basic Principles for the Scheduling Request in LTE," R2-062350, 3GPP TSG RAN WG2 #54, Aug. 2006.

Ericsson et al., "Framework for Scheduling Request and Buffer Status Reporting," R2-074691, TSG-RAN WG2 Meeting #60, Nov. 2007.

ASUSTek Computer Inc., "HFN de-synchronization detection with Integrity Protection scheme in a wireless communications system" U.S. Appl. No. 60/863,800.

Ericsson, "RLC status report format", R2-074701, TSG-RAN WG2 Meeting #60, Nov. 2007.

3rd Generation Partnership Project (3GPP); "Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007.

3rd Generation Partnership Project (3GPP); "Technical Specification Group Radio Access Network; Medium Access Control (MAC) protocol specification (Release 7)", 3GPP TS 25.321 V7.5.0, Jun. 2007.

Chairman, "LTE User Plane session report", R2-074536, 3GPP TSG RAN WG2 #59bis, Oct. 2008.

Nokia, "Buffer Reporting for E-UTRAN," R2-060829, 3GPP TSG-RAN WG2 Meeting #52, Mar. 2006, XP-002503218.

Nokia, "Uplink Scheduling for VoIP," R2-070476, 3GPP TSG-RAN WG2 Meeting #57, Feb. 2007, XP-008125208.

3rd Generation Partnership Project; "Technical Specification Group Radio Access Network; Medium Access Control (MAC) protocol specification (Release 7)", 3GPP TS 25.321, V7.5.0, Jun. 2007.

3rd Generation Partnership Project; "Technical Specification Group Radio Access Network; Evolved Universal Terrestrial Radio Access (E-UTRA) Medium Access Control (MAC) protocol specification (Release 8)", 3GPP TS 36.321, V1.0.0, Sep. 2007.

Qualcomm Europe, "Scheduling request mechanism", R1-071276, 3GPP TSG-RAN WG1 #48bis, Mar. 2007.

Texas Instruments, "Scheduling Request and DRX in E-UTRA", R1-072859, 3GPP TSG RAN WG1 #49bis, Jun. 2007.

Ericsson, "SDU Discard", R2-073230, 3GPP TSG-RAN WG2 #59, Aug. 2007.

Nokia Siemens Networks, "Update on Security, System Information, Mobility, MBMS and DRX", R2-073863, 3GPP TSG-RAN2 Meeting #59, Aug. 2007.

NTT DoCoMo, Inc. et al., "MAC PDU structure for LTE", R2-074174, 3GPP TSG RAN WG2 #59bis, Oct. 2007.

Motorola, "MAC Header format", R2-074419, 3GPP TSG-RAN2 Meeting #59bis, Oct. 2007.

Cohen, "An Improved SSCOP-like Scheme for Avoiding Unnecessary Retransmissions and Achieving Ideal Throughput," Proceedings of IEEE Infocom Conference on Computer Communications, pp. 855-862, Mar. 1996, XP-010158150.

Wang, RS., et al., "Operation of Control Protocol Data Units in Packet Data Convergence Protocol", U.S. Appl. No. 60/976,139, filed Sep. 28, 2007.

Mukherjee, R.P., et al., "Method and Apparatus of Performing Packet Data Convergence Protocol Reset", U.S. Appl. No. 61/019,058, filed Jan. 4, 2008.

NEC, "Considerations on Scheduling Information", R2-073556, 3GPP TSG-RAN WG2#59, Aug. 2007.

ITRI, "Buffer Status Reporting with Group Combining for LTE", R2-072833, 3GPP TSG-RAN-WG2 Meeting #58bis, Jun. 2007.

ASUSTeK, "On-line recovery of HFN synchronization due to RLC UM SN problem", R2-041940, 3GPP TSG-RAN WG2 meeting #44, Oct. 2004.

Rapporteur (ASUSTeK), "Summary of HFN de-synchronization problem off-line email discussion", R2-050318, 3GPP TSG RAN WG2 #46, Feb. 2005.

Kashima, T., "Method and Apparatus for Providing Timing Alignment", U.S. Appl. No. 60/944,662, filed Jun. 18, 2007.

Lin, L.C., "Enhanced Random Access Response Formats in E-UTRA", U.S. Appl. No. 61/006,348, filed Jan. 8, 2008.

Ericsson, "Scheduling Request in E-UTRAN," 3GPP TSG-RAN #47bis, R1-070471, Jan. 2007.

Qualcomm Europe, "Further Details on RACH Procedure," 3GPP TSG-RAN WG1 #48, R1-070649, Feb. 2007.

NTT DoCoMo, Inc., "Buffer Status Report and Scheduling Request triggers," 3GPP TSG-RAN WG2 #59, R2-073574, Aug. 2007.

LG Electronics Inc., "Correction of status reporting coding," 3GPP TSG RAN WG2 #61, R2-080969, Feb. 2008, pp. 1-3, XP-002624626.

Alcatel-Lucent, "PDCP status report carrying LIS only," 3GPP TSG RAN WG2 #61, R2-080902, Jan. 2008, XP-050138711.

3rd Generation Partnership Project (3GPP), "Technical Specification Group Radio Access Network; Evolved Universal Terrestrial Radio Access (E-UTRA); Packet Data Convergence Protocol (PDCP) specification (Release 8)," 3GPP TS 36.323, V8.2.1, May 2008, pp. 1-25, XP-050377638.

LG Electronics, "Correction to PDCP Status Report," 3GPP TSG RAN WG2 #61bis, R2-081594, Mar. 2008, pp. 1-8, XP-002624627.

3rd Generation Partnership Project, "Technical Specification Group Radio Access Network; Evolved Universal Terrestrial Radio Access (E-UTRA) Radio Link Control (RLC) protocol specification (Release 8)", 3GPP TS 36.322, V8.0.0, Dec. 2007.

NTT Docomo Inc., "Miscellaneous corrections to TS 36.322", 3GPP TSG-RAN2 Meeting #61bis, R2-081700, Mar. 2008.

Ericsson, "Clarification to the handling of large RLC status reports", 3GPP TSG-RAN2 Meeting #61bis, R2-082018, Mar. 2008.

LG Electronics, et al., "ACK_SN setting for short Status PDU", 3GPP TSG-RAN WG2 #62, R2-082133, May 2008.

LG Electronics Inc., "Correction to Polling Procedure", R2-081588, 3GPP TSG-RAN WG2 #61 bis, Mar. 2008.

"Universal Mobile Telecommunications System (UMTS); Radio Link Control (RLC) protocol specification (3GPP TS 25.322 version 4.10.0 Release 4)", ETSI TS 125 322 V4.10.0, Sep. 2003, XP-014016803.

State Intellectual Property Office of the People's Republic of China Application Serial No. 200980109358.5, Office Action dated Nov. 26, 2012, 6 pages.

United States Patent and Trademark Office U.S. Appl. No. 12/452,905, Office Action dated Dec. 3, 2012, 13 pages.

United States Patent and Trademark Office U.S. Appl. No. 12/922,538, Office Action dated Nov. 23, 2012, 12 pages.

United States Patent and Trademark Office U.S. Appl. No. 12/452,733, Final Office Action dated Jan. 8, 2013, 19 pages.

CATT, "Notification scheme for system information Change", R2-071870, 3GPP TSG-RAN WG2#58, May 2007, 5 pages.

LG Electronics Inc., "Discussion on BCCH Update", R2-072736, 3GPP TSG-RAN WG2 #58bis, Jun. 2007, 3 pages.

European Patent Office Application Serial No. 08011263.4, Search Report dated Dec. 7, 2012, 8 pages.

United States Patent and Trademark Office U.S. Appl. No. 13/107,232, Notice of Allowance dated Jan. 30, 2013, 17 pages.

National Office of Intellectual Property of Vietnam Application Serial No. 1-2010-00246, Office Action dated Jan. 25, 2013, 2 pages.

National Office of Intellectual Property of Vietnam Application No. 1-2010-00247, Office Action dated Feb. 26, 2013, 1 page.

United States Patent and Trademark Office U.S. Appl. No. 12/671,020, Notice of Allowance dated Feb. 14, 2013, 13 pages.

United States Patent and Trademark Office U.S. Appl. No. 13/107,329, Office Action dated Feb. 15, 2013, 10 pages.

The State Intellectual Property Office of the People's Republic of China Application Serial No. 200980100119.3, Office Action dated Feb. 5, 2013, 14 pages.

National Office of Intellectual Property of Vietnam Application No. 1-2010-00637, Notice of Allowance dated Mar. 28, 2013, 1 page.

United States Patent and Trademark Office U.S. Appl. No. 12/452,905, Final Office Action dated Apr. 11, 2013, 20 pages.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.2.0, May 2008, 33 pages.

ASUSTeK, "Minor corrections to 36.321," 3GPP TSG-RAN WG2 Meeting #67, R2-095152, Aug. 2009, 6 pages.

United States Patent and Trademark Office U.S. Appl. No. 12/733,179, Final Office Action dated Apr. 18, 2013, 21 pages.

Alcatel-Lucent, "Format for RACH Message 2", 3GPP TSG RAN WG2 #60bis, R2-080176, Jan. 2008.

Motorola, "Design of Backoff Scheme for LTE", 3GPP TSG RAN WG2, Meeting #56bis, R2-070143, Jan. 2007.

Mac Rapporteurs, et al., "E-UTRA MAC Protocol Specification Update", 3GPP TSG RAN2 Meeting #60bis, R2-080631, Jan. 2008.

NTT DoCoMo, Inc., "Uplink synchronization maintenance", R2-072014, 3GPP TSG RAN WG2 #58, May 2007, 4 pages, XP50134889.

European Patent Office Application Serial No. 08766423.1, Office Action dated Nov. 5, 2012, 5 pages.
United States Patent and Trademark Office U.S. Appl. No. 12/733,179, Office Action dated Oct. 31, 2012, 32 pages.
United States Patent and Trademark Office U.S. Appl. No. 13/441,698, Office Action dated Nov. 21, 2012, 31 pages.
United States Patent and Trademark Office U.S. Appl. No. 12/672,835, Final Office Action dated May 9, 2013, 16 pages.
Qualcomm Europe, "General Corrections to RLC," 3GPP TSG-RAN Working Group 2 #22, Tdoc R2-011701, Jul. 2001, 12 pages.
LG Electronics Inc., "Out-of-sequence problem in AM RLC: Discretely discarded SDUs," 3GPP TSG-RAN WG2 Meeting #21, R2-011206, May 2001, 2 pages.
Japan Patent Office Application Serial No. 2012-151205, Office Action dated Apr. 16, 2013, 2 pages.
The State Intellectual Property Office of the People's Republic of China Application Serial No. 200880021003.6, Certificate dated Apr. 3, 2013, 15 pages.

* cited by examiner

| Index | LCID values |
|---|---|
| 00000-yyyyy | Identity of the logical channel |
| yyyyy-11000 | reserved |
| 11001 | CCCH Message |
| 11010 | DCCH Message with UE ID |
| 11011 | BSR with UE ID |
| 11100 | Power Headroom Report |
| 11101 | Short Buffer Status Report |
| 11110 | Long Buffer Status Report |
| 11111 | Padding |

(a)

| Index | LCID values |
|---|---|
| 00000-yyyyy | Identity of the logical channel |
| yyyyy-10111 | reserved |
| 11000 | UE ID |
| 11001 | CCCH Message |
| 11010 | DCCH Message with UE ID |
| 11011 | BSR with UE ID |
| 11100 | Power Headroom Report |
| 11101 | Short Buffer Status Report |
| 11110 | Long Buffer Status Report |
| 11111 | Padding |

(b)

METHOD OF EFFECTIVELY TRANSMITTING IDENTIFICATION INFORMATION OF TERMINAL DURING THE GENERATION OF DATA BLOCK

CROSS-REFERENCE TO RELATED APPLICATIONS

This application is the National Stage filing under 35 U.S.C. §371 of International Application No. PCT/KR2008/006200, filed on Oct. 20, 2008, which claims the benefit of earlier filing date and right of priority to Korean Application No. 10-2008-0102222, filed on Oct. 17, 2008, and also claims the benefit of U.S. Provisional Application Ser. Nos. 60/982,120, filed on Oct. 23, 2007, 60/983,304, filed on Oct. 29, 2007, 60/984,052, filed on Oct. 31, 2007, 61/018,884, filed on Jan. 3, 2008, and 61/019,575, filed on Jan. 7, 2008.

TECHNICAL FIELD

The present invention relates to a radio communication system providing a radio communication service and a terminal, namely, a method for communicating data blocks between a base station and the terminal in Evolved Universal Mobile Telecommunications System (E-UMTS) or Long Term Evolution (LTE) System evolved from UMTS, and more particularly, to a method of effectively identifying a transmitter of a data block received by a receiver.

BACKGROUND ART

Figure 1:
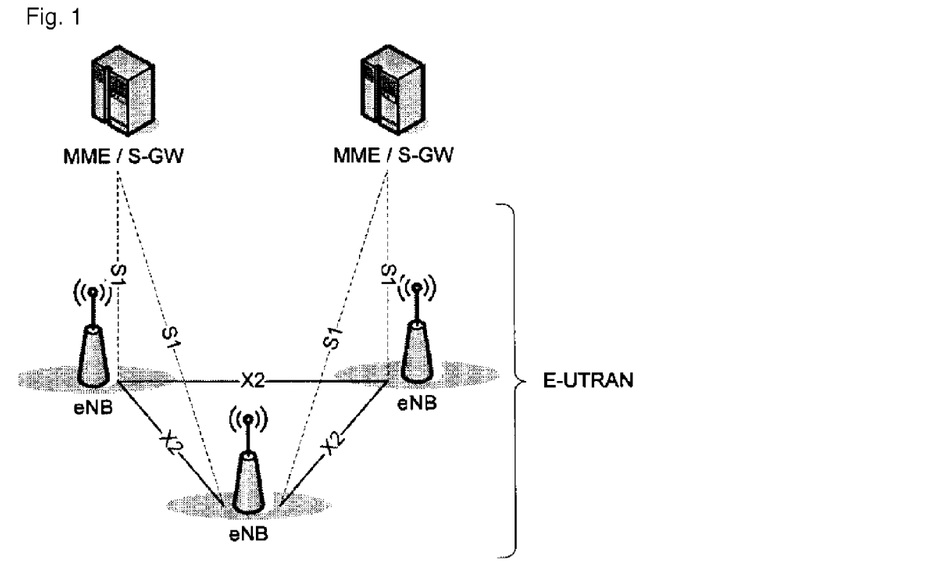
FIG. 1 illustrates a network architecture of E-UTRAN as a mobile communication system operable with the related art and the present invention.

FIG. 1 illustrates a network architecture of E-UMTS as a mobile communication system to which the related art and the present invention are applied. The E-UMTS system has evolved from the existent UMTS system and a basic standardization therefor is undergoing in 3GPP. Such E-UMTS system may also be referred to as a Long Term Evolution (LTE) system.

E-UMTS network may be divided into E-UTRAN and Core Network (CN). The E-UTRAN includes a terminal (User Equipment, referred to as 'UE' hereinafter), a base station (referred to as 'eNode B' hereinafter), a Serving Gateway (S-GW) located at the end of the network to be connected to an external network, and a Mobility Management Entity (MME) for managing the mobility of the UE. One or more cells may exist in one eNode B.

Figure 2:
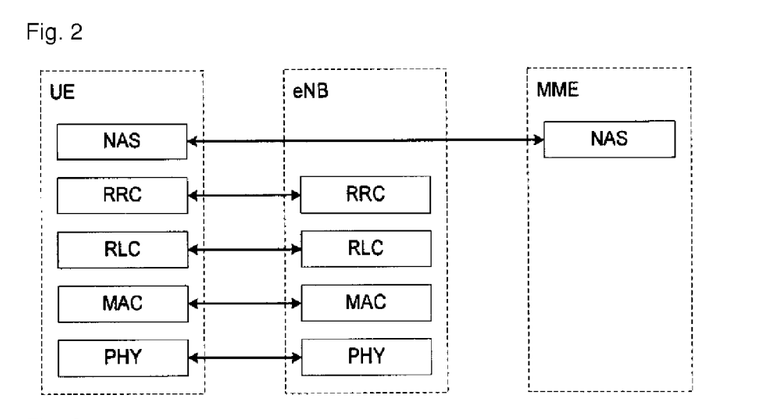
FIG. 2 is an exemplary view illustrating an architecture of radio interface protocols between a terminal and E-UTRAN in a control plane according to the related art.

FIG. 2 illustrates a radio interface protocol architecture between UE and base station based on the 3GPP radio access network standard. The radio interface protocol has horizontal layers comprising a physical layer, a data link layer and a network layer, and has vertical planes comprising a user plane for transmitting data information and a control plane for transmitting a control signaling. The protocol layers can be divided into a first layer (L1), a second layer (L2) and a third layer (L3) based on three lower layers of an Open System Interconnection (OSI) standard model widely known in communications systems.

Figure 3:
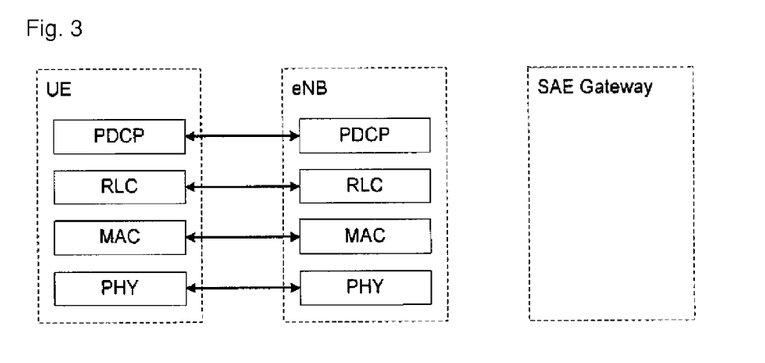
FIG. 3 is an exemplary view illustrating an architecture of radio interface protocols between a terminal and E-UTRAN in a user plane according to the related art.

Hereinafter, each layer in the radio protocol control plane in FIG. 2 and a radio protocol user plane in FIG. 3 will be described.

A first layer, as a physical layer, provides an information transfer service to an upper layer using a physical channel. The physical layer is connected to its upper layer, called a Medium Access Control (MAC) layer, via a transport channel. The MAC layer and the physical layer exchange data via the transport channel. Data is transferred via a physical channel between different physical layers, namely, between the physical layer of a transmitting side and the physical layer of a receiving side.

The MAC layer located at the second layer provides a service to an upper layer, called a Radio Link Control (RLC) layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer is used to efficiently transmit IP packets, such as IPv4 or IPv6, on a radio interface with a relatively small bandwidth. For this purpose, the PDCP layer reduces the size of an IP packet header which is relatively great in size and includes unnecessary control information, namely, a function called header compression is performed.

A Radio Resource Control (RRC) layer located at the lowermost portion of the third layer is only defined in the control plane. The RRC layer controls logical channels, transport channels and physical channels in relation to configuration, re-configuration and release of Radio Bearers (RBs). Here, the RB signifies a logical path provided by the first and second layers of the radio protocols for data transmissions between the terminal and the UTRAN. In general, the establishment of the RB refers to stipulating the characteristics of a protocol layer and a channel required for providing a specific service, and setting the respective detailed parameters and operation methods. If an RRC connection is established for the communication of RRC messages between the RRC layer of the terminal and the RRC layer of the UTRAN, the terminal is in the RRC connected mode. Otherwise, the terminal is in an RRC idle mode.

Logical channels are defined between an RLC entity and a MAC entity, and may be divided according to characteristics of data on such logical channels. Transport channels are defined between a physical layer and a MAC entity and may be divided according to how to transmit data on the transport channels.

A random access (RACH) process of a terminal to a base station is described as follows. First, the terminal selects usable random access signature and random access occasion from system information transmitted from the base station via an RRC signal, and then transmits a random access preamble (hereinafter, referred to as message 1) to the base station (Step 1). After successfully receiving the message 1 of the terminal, the base station then transmits a random access response (hereinafter, referred to as message 2) (Step 2). Here, the message 2 includes uplink time synchronization information (Time Advance: TA) with the base station, information (e.g., initial grant) related to uplink radio resource allocation of an identifier C-RNTI to be used in a corresponding cell, and the like. After receiving the message 2, the terminal transmits MAC PDU (hereinafter, referred to as message 3) configured based upon the information related to the radio resource allocation included in the message 2 (Step 3). The base station then either allocates radio resources or transmits an RRC message, according to the message 3 received from the terminal (Step 4).

During data communication between the terminal and the base station, an RACH message 3 is used in the following cases. 1) When the terminal transmits an RRC connection request: since the base station cannot know the existence of the terminal having no RRC connection, the terminal cannot be allocated with radio resources from the base station. The terminal should perform an RACH process for data transmission. 2) When the terminal accesses a target cell: since the terminal has no radio resource allocated thereto during a handover process, the terminal performs an RACH process and transmits a Handover Complete message during the RACH process. 3) When the terminal accesses a new cell under a radio link failure: after having accessed a cell, if a radio environment becomes bad in a state where the terminal failed to receive a handover command and accordingly the connection to the originally accessed cell is disconnected, the terminal re-searches for a cell and accesses a new cell. Here, the terminal performs the RACH in order to transmit data to the new cell. 4) When the terminal in the RRC connected state transmits a radio resource request to the base station: the terminal in the RRC connected state, staying in one cell, performs the RACH for transmitting a radio resource allocation request (Buffer Status Report, BSR) to the base station when the terminal having no uplink radio resource allocated thereto receives data from an upper entity.

Such different cases can be represented in a table as follows.

Table 1

TABLE 1

| Scenario | Related Logical channel | MAC layer needs UE ID? | Multiplexing support required? |
|---|---|---|---|
| 1. RRC CONN REQUEST | CCCH (TM) | No | No |
| 2. HO COMPLETE | DCCH (AM) | Yes | No |
| 3. HO/RL FAILURE | CCCH (TM) | No | No |
| 4. BSR | N/A | Yes | Yes |

That is, the RACH message 3 should discriminate each different case as shown in the table. However, the RACH process basically assumes a contention. Namely, in a particular RACH process, the base station should assume that a plurality of terminals can always simultaneously initiate the RACH process. In other words, upon receiving the RACH message 3, the base station should identify which terminal has transmitted the RACH message 3. For CCCH message, the CCCH message itself includes a terminal identifier. Thus, in this case, if the CCCH message is included in a MAC PDU, the MAC entity takes no action but transfers the CCCH message to the RRC.

On the other hand, for BSR, for example, the BSR is transmitted regardless of a message from an upper end. Accordingly, the terminal identifier should be transferred to the base station in a different manner from the CCCH. In particular, a method of effectively identifying the terminal by the MAC entity is required.

For example, when a Dedicated Scheduling Channel (D-SR channel) is allocated to the terminal, whenever data to be transmitted in uplink is generated, the terminal should inform it to the base station via the D-SR channel, and the base station allocates radio resources to the terminal using a terminal specific identifier. In this case, when performing transmission using the allocated radio resource, the terminal does not have to inform its identifier. This is because the base station and a particular terminal have already known how the radio resource is to be used. However, in case of performing transmission via RACH, there is no way to identify a particular terminal, resulting in difficulty of identification.

DISCLOSURE OF INVENTION

Technical Solution

Therefore, it is an object of the present invention to provide a method in which a terminal effectively informs a base station of whether an identifier exists, as well as informing its own identifier during a process of communicating data and control messages between the terminal and the base station. Accordingly, a terminal identifier is allowed to be included only when required, thus to reduce an overhead. Also, when several control information are included in MAC PDU, an identifier appropriate for a combination is allowed to be included so as to reduce the portion of MAC PDU occupied by a MAC header, thereby enhancing a use efficiency of radio resources.

To achieve these objects, there is provided a method of communicating data in wireless communication system, the method comprising: transmitting a random access preamble; receiving a random access response in response to the transmitted random access preamble, wherein the random access response includes information for allocating a radio resource; and transmitting a protocol data unit (PDU) using the allocated radio resource, wherein the protocol data unit includes a terminal identifier.

Preferably, at least one field of the PDU is used to indicate an existence of the terminal identifier.

Preferably, the at least one field is a particular field among logical channel ID (LCID) fields.

Preferably, the LCID fields are used to identify a logical channel or a type of control information.

Preferably, the steps are performed when a terminal is in a connected state.

Preferably, the random access preamble is randomly selected by the terminal.

Preferably, the terminal identifier is a cell radio network temporary identity (C-RNTI) or one of MAC control element.

Preferably, the information is an uplink grant.

In another aspect of the present invention, a method of generating a protocol data unit (PDU) in wireless communication system may comprise: generating the protocol data unit (PDU) with a header, wherein the header includes at least one field, wherein the at least one field is used to identify a logical channel or used to identify a type of control information, and wherein the at least one field is used to indicate an existence of a terminal identifier, and delivering the generated protocol data unit to a lower layer.

Preferably, the at least one field is a particular field among logical channel ID (LCID) fields.

Preferably, the steps are performed when a terminal is in a connected state.

MODE FOR THE INVENTION

One aspect of the present invention is the recognition by the present inventors regarding the problems and drawbacks of the related art described above and explained in more detail hereafter. Based upon such recognition, the features of the present invention have been developed.

The present invention is applied to a 3GPP communication technique, in particular, a Universal Mobile Telecommunications system, communication apparatus and communication method. However, without being limited to this, the present invention can be applied to all the wired/wireless communications to which the technical features of the present invention are applicable.

The present invention conceptually provides a data communication method in a wireless communication system, the method comprising: transmitting a random access preamble; receiving a random access response in response to the transmitted random access preamble, wherein the random access response includes information for allocating a radio resource; and transmitting a protocol data unit (PDU) using the allocated radio resource, wherein the protocol data unit includes a terminal identifier, and also proposes a wireless communication terminal and a radio network, capable of performing such method.

Also, the present invention proposes a method of generating a protocol data unit (PDU) in wireless communication system, the method comprising: generating the protocol data unit (PDU) with a header, wherein the header includes at least one field, wherein the at least one field is used to identify a logical channel or used to identify a type of control information, and wherein the at least one field is used to indicate an existence of a terminal identifier; and delivering the generated protocol data unit to a lower layer, and a wireless communication terminal and a wireless network capable of performing such method.

Hereinafter, description will be made of configuration and operation of exemplary embodiments of the present invention with reference to the accompanying drawings.

Figure 4:
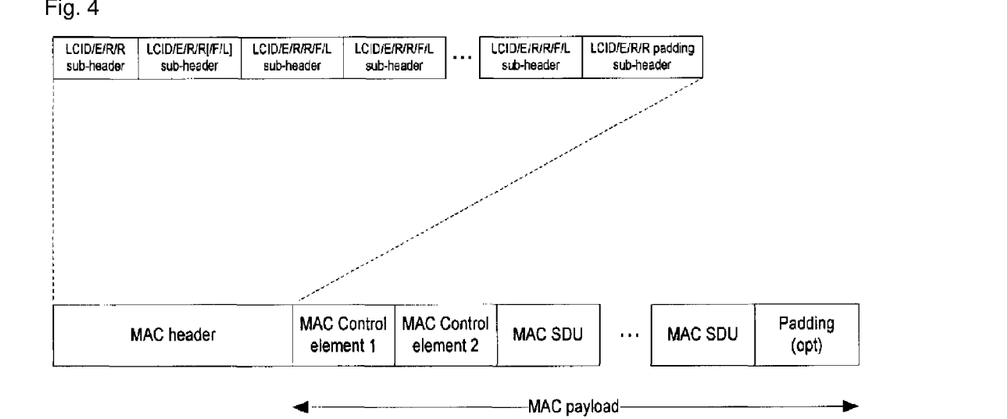
FIG. 4 is an exemplary view illustrating a format of Protocol Data Unit (PDU) used in a Medium Access Control (MAC) entity.
Figure 5:
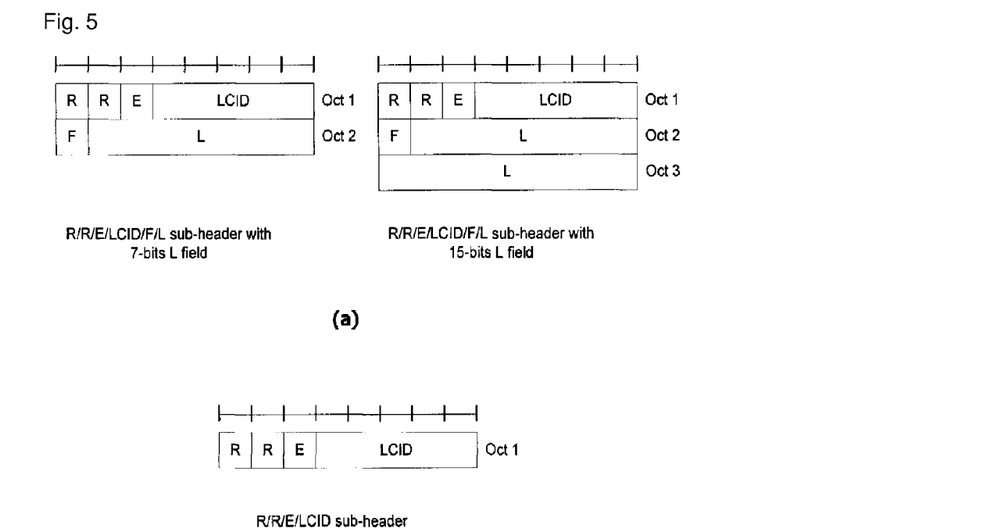
FIG. 5 is an exemplary view illustrating a format of a MAC sub-header used in the MAC entity.

As mentioned above, the RACH message 3 has to be discriminated in various situations. Also, in order to prevent the increase in complexity, a MAC PDU transmitted via the RACH message 3 can be configured in formats as shown in FIGS. 4 and 5. FIG. 4 shows a format of MAC PDU used in a MAC entity. In FIG. 4, a logical channel ID (LCID) indicates which logical channel corresponds to a MAC SDU, and L field indicates the size of the corresponding MAC SDU. E field indicates an existence of additional headers. During the process, if the size of the corresponding MAC SDU or MAC Control Element (CE) is equal to or smaller than 127, 7-bit L field as shown in FIG. 5 may be used. If the size of the corresponding MAC SDU or MAC control element is greater than 127, 15-bit L field as shown in FIG. 5 may be used. A MAC sub-header of a MAC SDU included in a MAC PDU or a MAC control element with a fixed size may use the format of MAC sub-header shown in FIG. 5(b), and otherwise, may use the format of a MAC sub-header shown in FIG. 5(a).

Each field used in FIG. 4 is described in detail as follows.
LCID: indicates which logical channel has data corresponding to a MAC SDU or what kind of information is included in the corresponding MAC CE.
E: indicates an existence of another MAC sub-header sequential to a current MAC sub-header.
F: indicates the length of next L field.
R: is a reserved bit, and also is a bit not used.

Here, information related to values used for the LCID can be represented in Table as follows.

TABLE 2

| LCID values for DL-SCH | |
| --- | --- |
| Index | LCID values |
| 00001-xxxxx | Identity of the logical channel |
| xxxxx-11011 | Reserved |
| 11100 | UE Contention Resolution Identity |
| 11101 | Timing Advance |
| 11110 | DRX Command |
| 11111 | Padding |

TABLE 3

| LCID values for UL-SCH | |
| --- | --- |
| Index | LCID values |
| 00000-yyyyy | Identity of the logical channel |
| yyyyy-11011 | Reserved |
| 11100 | Power Headroom Report |
| 11101 | Short Buffer Status Report |
| 11110 | Long Buffer Status Report |
| 11111 | Padding |

Hereinafter, descriptions of a Random Access Channel (RACH) through which a terminal transmits an initial control message to a network will be given in more detail. In general, there are several reasons to use the RACH: for time synchronization of a terminal with a network, and for acquiring radio resources when the terminal needs an uplink data transmission but there is no uplink radio resources to transmit such data. For instance, the terminal is turned on to initially access to a new cell. In this case, the terminal would perform downlink synchronization and receive system information of a cell desiring to access. After receiving the system information, the terminal should transmit an RRC connection request message for the RRC connection. However, the terminal is not time-synchronized with a current network and also does not acquire uplink radio resources. Accordingly, the terminal may use the RACH to request radio resources for transmitting the RRC connection request message to the network. The base station, having received the request for corresponding radio resources, may allocate appropriate radio resources to the terminal. Then, the terminal may transmit the RRC connection request message to the network using the radio resources. In another example, it is assumed that the terminal has an RRC connection with the network. In this case, the terminal may receive radio resources depending on radio resource scheduling of the network, and may transmit data to the network through the radio resources. However, if there were no data to be transmitted in a buffer of the terminal, the network would not further allocate uplink radio resources to the terminal. This is because it is inefficient to allocate the uplink radio resources to the terminal, which does not have data to be transmitted. Here, a buffer state of the terminal may be reported to the network periodically or upon occurrence of event. If new data to be transmitted is presently existed in the buffer of the terminal having no radio resources, the terminal would use the RACH since it has no allocated uplink radio resources. That is, the terminal may use the RACH to request the radio resources required for data transmission from the network.

In general, the base station and the terminal may transmit or receive data through a physical channel Physical Downlink Shared Channel (PDSCH) using a transport channel DL-SCH, with the exception of a specific control signal or a particular service data. Also, information on which terminal (or a plurality of terminals) should receive data of the PDSCH and information on how the terminals should receive the PDSCH data and perform decoding, are transmitted by being included in the physical channel Physical Downlink Control Channel (PDCCH).

For instance, it is assumed that a certain PDCCH is under CRC masking as an "A" RNTI (Radio Network Temporary Identifier), and is being transmitted in a certain subframe by including information about data being transmitted in transfer format information "C" (e.g., a transport block size, modulation and coding information, etc.) through radio resources "B" (e.g., a frequency location). Under such condition, one or more terminals in a corresponding cell may monitor the PDCCH by using their own RNTI information. If there are one or more terminals having A RNTI at a corresponding point of time, the terminals shall receive the PDCCH, and through information of the received PDCCH, also receive a PDSCH indicated by B and C.

As aforementioned, the present invention proposes a method by which a terminal effectively informs its own identifier to the base station and additionally informs an existence of an identifier to the base station, during the communication of data and control messages between the terminal and the base station. In relation to this, the present invention also desires to propose a method of reducing an overhead by allowing a terminal identifier to be included if necessary. In case where several control information are included in MAC PDU, it is allowed to include an identifier appropriate for the combination, thus to reduce the portion of the MAC PDU occupied by a MAC header, thereby enhancing a use efficiency of radio resources.

Therefore, the present invention is directed to include a terminal identifier in a MAC PDU in cases as follows. In detail, the following concepts may be proposed in the present invention. If a terminal includes its identifier in a MAC PDU, it is proposed that the terminal includes an LCID field set to a specific value in the MAC PDU. That is, the LCID set to the specific value indicates that the terminal identifier is included in the MAC PDU. During this process, the terminal identifier may be included in the MAC PDU using a MAC control element. That is, the MAC control element including the terminal identifier may be indicated by the LCID field set to the specific value. Here, the terminal identifier may be one of MAC control elements, C-RNTI or an identifier used in an upper layer. The C-RNTI may be used when the terminal is in an RRC connected mode, and the identifier used in the upper layer may be used when the terminal is in an RRC idle mode. The MAC control element including the terminal identifier may include an indicator indicating a type of the terminal identifier as well as the terminal identifier. Here, the MAC control element may be indicated by the LCID. The LCID may be included in a MAC sub-header of MAC PDU. If the types of terminal identifiers are provided in plurality, a plurality of LCIDs indicating each terminal identifier may be used. That is, an individual LCID field is used for each type of terminal identifier. In addition, whether a terminal identifier exists in a MAC PDU may be indicated by whether the LCID set to the specific value is included in the MAC PDU.

During a handover process of the present invention, a terminal which transmits a handover complete message using an RACH in a new cell may use a particular LCID for indicating the handover complete message. That is, in order to inform that the handover complete message is included in the MAC PDU, the LCID of the MAC PDU may be allocated with a specific value. During the process, the handover complete message may be transmitted as a MAC control element.

During the processing of a radio link failure according to the present invention, a terminal which transmits a radio link failure message using an RACH in a new cell may use a specific LCID for indicating the radio link failure message. That is, in order to inform that the radio link failure message is included in the MAC PDU, the LCID of the MAC PDU may be allocated with a specific value. During this process, the radio link failure message may be transmitted as a MAC control element. The radio link failure message during the process may be used when the terminal transmits a RRC message in a new cell after the radio link failure occurs.

During the handover process according to the present invention, when a terminal which moved into a new cell transmits a handover complete message, the following situations can be considered. That is, 1) if a radio resource required to transmit the handover complete message is allocated using a terminal specific identifier, the terminal may include an encoded RRC message in the MAC PDU but not include the terminal identifier in the MAC PDU. 2) If a radio resource required to transmit the handover complete message is allocated using a terminal common identifier, the terminal may include both the encoded RRC message and the terminal identifier in the MAC PDU.

Also, if a radio resource for a message transmission is allocated using a terminal common identifier according to a setting, the RRC message may not be encoded.

In case where a terminal performs transmission using a RACH message 3 according to the present invention, the terminal may always include its identifier in the MAC PDU. Also, when transmitting the MAC PDU through the RACH message 3, an indicator indicating whether the MAC PDU includes an RRC message may be included in a MAC header. When transmitting the MAC PDU through the RACH message 3, an indicator indicating whether the MAC PDU includes either a MAC level terminal identifier or an RRC level terminal identifier may be included in the MAC header. In addition, when transmitting the MAC PDU through the RACH message 3, an indicator indicating whether or not the MAC PDU includes the MAC level terminal identifier may be included in the MAC header. When transmitting the MAC PDU through the RACH message 3, an indicator indicating whether the MAC PDU includes a MAC control element message may be included in the MAC header.

Furthermore, the present invention provides two types of BSRs. That is, BSR includes two types of MAC control elements. One of them indicates that the BSR is transmitted using other type of radio resource excluding the RACH message 3. In this case, a terminal identifier is not included. That is, this indicates a case that a radio resource is allocated using a terminal specific identifier. The other of them indicates that the BSR is transmitted through the RACH message 3. In this case, a terminal identifier is included. That is, a radio resource is allocated but not using a terminal specific identifier. In this case, a MAC PDU format, different from a MAC PDU format used when using the radio resource allocated using the terminal specific identifier, may be used.

Here, an indicator indicating whether a terminal identifier is included in a BSR message may further be included. The indicator may be included in every BSR message. The indicator may be included when a radio resource used upon transmitting the BSR is allocated using an identifier other than the terminal specific identifier.

Also, the indicator may be included when the BSR is transmitted through the RACH message 3. During the process, the identifier other than the terminal specific identifier or the terminal common identifier may be an identifier allocated to the terminal using an RACH message 2.

Figure 6:
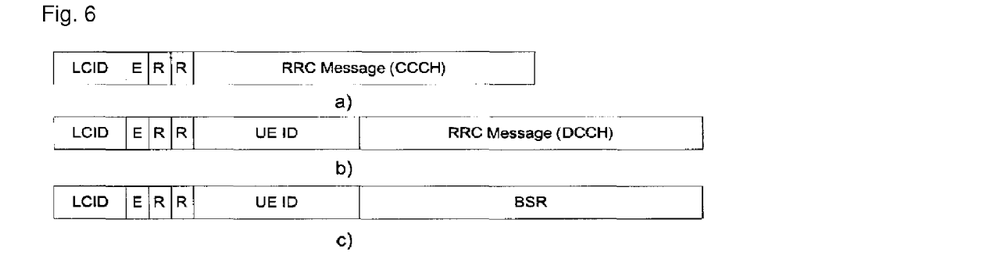
FIG. 6 is an exemplary view illustrating a format of another MAC sub-header used in the MAC entity.

According to the present invention, one of two R fields existing in a MAC sub-header may be used to indicate whether a MAC PDU includes a terminal identifier. FIG. 6 is an exemplary view showing such format of MAC PDU. In FIG. 6, a case (a) indicates that the RACH message 3 is used to transmit an RRC connection request. A case (b) indicates that the RACH message 3 is used to transmit an upper message together with the terminal identifier, namely, transmit the handover complete message. A case (c) indicates that the RACH message 3 is used to transmit the BSR together with the terminal identifier. In the cases (b) and (c) of FIG. 6, one LCID may inform the existence of two elements. That is, one LCID may inform that UE ID and BSR are included, and another LCID may indicate that UE ID and DCCH message are included. The definition of LCIDs according to the cases is shown in Tables as follows.

Figure 7:
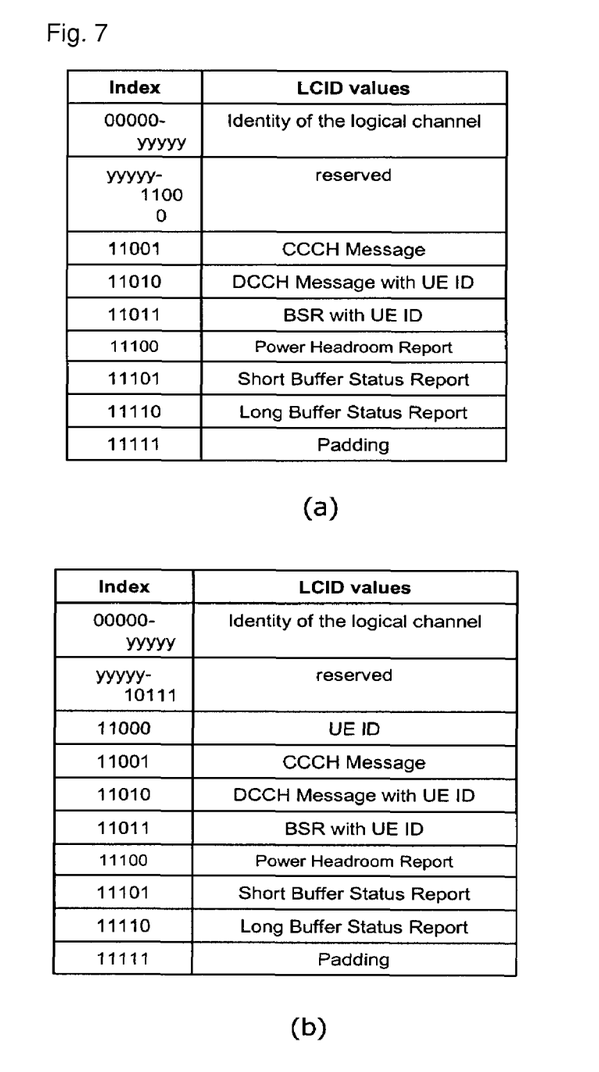
FIGS. 7(a) and 7(b) are exemplary views illustrating a LCID field of a MAC sub-header according to the present invention.

FIGS. 7a and 7b are exemplary views showing LCID fields of a MAC sub-header used according to the present invention. FIG. 7a is a table illustrating a definition of LCID according to the present invention. Here, a case that a terminal identifier is only included according to an allocated amount of radio resource of the RACH message 3 may be available. In this case, the table of FIG. 7(a) may be changed in a table of FIG. 7(b). Each table, as shown in FIGS. 7(a) and 7(b), may include indexes for indicating CCCH message, DCCH message including UE ID or BSR including UE ID. Also, one LCID field for MAC SDU, MAC control element or padding included in a MAC PDU may exist. Here, 5-bit LCID field in size may be provided.

The present invention can allow an efficient use of radio resources by proposing a method of effectively transmitting terminal identification information, upon configuring MAC PDU by a MAC entity.

The present invention may provide a method of communicating data in wireless communication system, the method comprising: transmitting a random access preamble; receiving a random access response in response to the transmitted random access preamble, wherein the random access response includes information for allocating a radio resource; and transmitting a protocol data unit (PDU) using the allocated radio resource, wherein the protocol data unit includes a terminal identifier, at least one field of the PDU is used to indicate an existence of the terminal identifier, the at least one field is a particular field among logical channel ID (LCID) fields, the LCID fields are used to identify a logical channel or a type of control information, the steps are performed when a terminal is in a connected state, the random access preamble is randomly selected by the terminal, the terminal identifier is a cell radio network temporary identity (C-RNTI) or one of MAC control element, and the information is an uplink grant.

It can be also said that the present invention may provide a method of generating a protocol data unit (PDU) in wireless communication system, the method comprising: generating the protocol data unit (PDU) with a header, wherein the header includes at least one field, wherein the at least one field is used to identify a logical channel or used to identify a type of control information, and wherein the at least one field is used to indicate an existence of a terminal identifier, and delivering the generated protocol data unit to a lower layer, wherein the at least one field is a particular field among logical channel ID (LCID) fields, the steps are performed when a terminal is in a connected state.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of communicating data in wireless communication system, the method comprising steps of:
    transmitting a random access preamble;
    receiving a random access response in response to the transmitted random access preamble, wherein the random access response includes a radio resource allocation; and
    transmitting a protocol data unit (PDU) using the allocated radio resource,
    wherein the PDU includes a terminal identifier and logical channel ID (LCID) fields,
    wherein at least one field of the PDU is used to indicate an existence of the terminal identifier,
    wherein the at least one field is a particular field of the LCID fields,
    wherein the LCID fields are used to identify a logical channel or a type of control information,
    wherein the at least one field comprises a specific value identifying the existence of the terminal identifier, and
    wherein the specific value is indicated by 5 bits.

2. The method of claim 1, wherein the steps are performed when a terminal is in a connected state.

3. The method of claim 1, wherein the random access preamble is randomly selected by a terminal.

4. The method of claim 1, wherein the terminal identifier is a cell radio network temporary identity (C-RNTI).

5. The method of claim 1, wherein the radio resource allocation is an uplink grant.

6. A method of generating a protocol data unit (PDU) in wireless communication system, the method comprising steps of:
    transmitting a random access preamble;
    receiving a random access response in response to the transmitted random access preamble, wherein the random access response includes a radio resource allocation;
    generating the PDU with a header,
    wherein the generated PDU includes a terminal identifier,
    wherein the header includes logical channel ID (LCID) fields,
    wherein the LCID fields are used to identify a logical channel or used to identify a type of control information,
    wherein at least one field is used to indicate an existence of the terminal identifier,
    wherein the at least one field is a particular field of the LCID fields,
    wherein the at least one field comprises a specific value identifying the existence of the terminal identifier, and
    wherein the specific value is indicated by 5 bits; and
    transmitting the generated PDU using the allocated radio resource.

7. The method of claim 6, wherein the steps are performed when a terminal is in a connected state.

* * * * *